Feb. 17, 1948.   S. G. ISSERSTEDT   2,435,966
ELECTRONIC CONTROL APPARATUS FOR MOTORS
Filed March 26, 1943   2 Sheets-Sheet 1

Inventor
SIEGFRIED G. ISSERSTEDT
By
George H. Fisher
Attorney

Feb. 17, 1948.  S. G. ISSERSTEDT  2,435,966
ELECTRONIC CONTROL APPARATUS FOR MOTORS
Filed March 26, 1943    2 Sheets-Sheet 2

Inventor
SIEGFRIED G. ISSERSTEDT
By George H. Fisher
Attorney

Patented Feb. 17, 1948

2,435,966

UNITED STATES PATENT OFFICE 2,435,966

ELECTRONIC CONTROL APPARATUS FOR MOTORS

Siegfried G. Isserstedt, Toronto, Ontario, Canada, assignor to Minneapolis-Honeywell Regulator Company, Minneapolis, Minn., a corporation of Delaware Application March 26, 1943, Serial No. 480,668

11 Claims. (Cl. 318—29)

The present invention is concerned with motor control apparatus designed to provide a novel motor control system of the type in which the energization of the motor is controlled by an electronic discharge device.

An object of the present invention is to provide a motor control system of extreme sensitivity in which an electronic amplifier is employed to control the motor and in which the effect of a normal controlling voltage on the input circuit of the amplifier is periodically changed in magnitude.

A still further object of the invention is to provide such a system in which the control voltage is a cyclically varying voltage such as an alternating voltage.

A further object of the invention is to provide such a system in which the control voltage is periodically increased in magnitude by an abrupt voltage peak without introducing transient effects.

A still further object of the invention is to provide such a system in which the effect of the control voltage is gradually changed in magnitude.

A still further object of the invention is to provide such a system in which the effect of the controlling voltage is periodically increased and then decreased.

A still further object of the invention is to provide such in which the voltage applied to the input circuit of the amplifier is supplied by an impedance bridge and varies in magnitude and phase with the relative values of the impedance in said bridge.

A still further object of the present invention is to provide such a system in which a plurality of electronic amplifiers are employed and in which the effect of the normal controlling voltage on the input circuits of both amplifiers is simultaneously varied.

A still further object of the invention is to provide an extremely sensitive amplifier in which the magnitude of a biasing voltage is periodically varied so as to vary the magnitude of the signal voltage required to cause operation of the amplifier.

Other objects of the invention will be apparent from a consideration of the accompanying specification, claims and drawing, of which

Figure 4 is a diagrammatic view indicating the relationship between the grid and plate voltages of the system shown in Figure 3.

Figure 1:
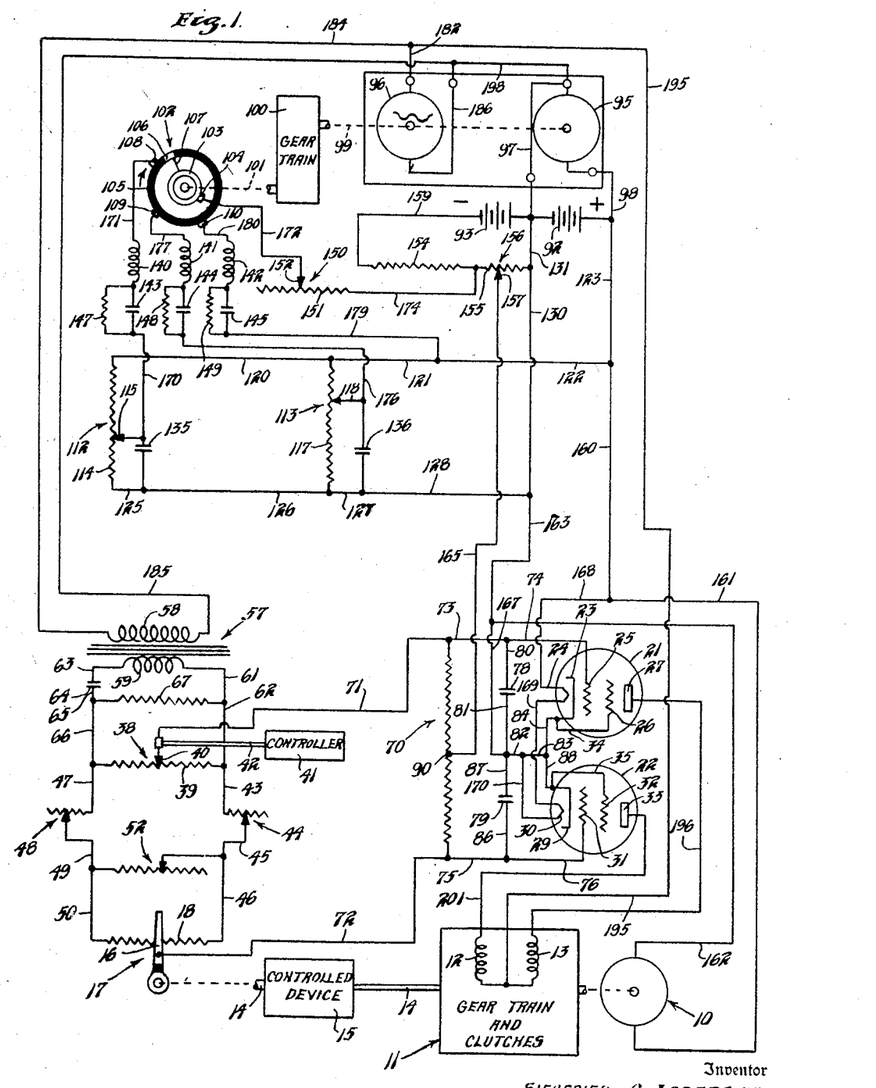
Figure 1 is a schematic view of one form of my motor control system.

Referring to Figure 1 of the drawing, the motor associated with the motor mechanism to be controlled is indicated by the reference numeral 10. This motor may be any conventional form of direct current motor which continuously rotates in one direction upon a direct current being passed therethrough. The motor 10 is designed to form a driving unit of a servo motor assembly having a reduction gear train and clutches for causing a driven shaft to be driven in one direction or the other. For purposes of simplicity, the mechanism including the gear train and clutches has not been shown but is merely designated by the reference numeral 11. These clutches are in the form of a pair of electromagnetic clutches, one or the other of which is energized. The electromagnetic windings of these clutches are designated in the drawing by reference characters 12 and 13. When winding 12 is energized, one clutch is engaged and the motor is effective to rotate a shaft 14 in one direction. When electromagnetic winding 13 is energized, on the other hand, the other clutch is engaged and the shaft 14 is rotated in the opposite direction. The motor 10 and the assembly 11 together constitute a motor means functioning to provide reversible motor action. Any other suitable reversible motor arrangement could be employed. The shaft 14 is connected to a suitable controlled device 15 which illustratively might be the operating mechanism for an airplane rudder. The shaft 14 is also connected to a contact arm 16 of a control potentiometer 17. The contact arm 16 is adapted slidably to engage resistance element 18.

The current flow through electromagnetic windings 12 and 13 is controlled by a pair of electronic discharge tubes 21 and 22. In the particular application which I contemplate, I have found it desirable to employ gas filled tubes although it is to be understood that the invention is not so limited. The tube 21 comprises an indirectly heated cathode 23 having a heater 24, a control grid 25, a shield grid 26, and an anode 27. Similarly, the tube 22 comprises an indirectly heated cathode 29 having a heater 30, a control grid 31, a shield grid 32 and an anode 33. The tubes 21 and 22 may be of any suitable gas filled type. I have found the type 2050 gas filled tube particularly desirable for this purpose. In the particular application contemplated, I have found it desirable to connect the shield grids 26 and 32 to their associated cathodes 23 and 29 by conductors 34 and 35.

The operation of the tubes 21 and 22 is controlled by an impedance bridge including the potentiometer 17 previously described and a control potentiometer 38. This control potentiometer comprises a resistor 39 and a slidable contact 40. The slidable contact 40 is adapted to be positioned by any suitable controller 41 to which it is connected by a link 42. The controller 41 may illustratively be the gyroscope in an aircraft for controlling the position of the rudder in order to keep the aircraft on the course for which the gyroscope is set. The right hand end of resistor 39 is connected to the right-hand end of resistor 18 by conductor 43, a rheostat 44, and conductors 45 and 46. The left-hand end of the resistor 39 is similarly connected to the left-hand end of resistor 18 by conductor 47, a rheostat 48, and conductors 49 and 50. A further rheostat 52 is connected between the junction of conductors 49 and 50 on the one hand and the junction of conductors 45 and 46 on the other. The rheostat 52 is connected in parallel with potentiometer 17.

Power is supplied to the impedance bridge including potentiometers 17 and 38 by a step-down transformer 57. This transformer comprises a high voltage primary 58 and a low voltage secondary 59. The low voltage secondary 59 is connected across resistors 18 and 39 and serves to supply power to the bridge. The right-hand end of the secondary is connected directly to the right-hand end of resistor 39 by conductors 61 and 62. The left-hand end of secondary 59 is connected to the left-hand end of winding 39 by conductor 63, a condenser 64 and conductors 65 and 66. A resistor 67 is connected between the junction of conductors 65 and 66 and the junction of conductors 61 and 62. The condenser 64 and resistor 67 serve to shift slightly the phase of the voltage applied to the bridge including potentiometers 17 and 38 so that the output voltage as applied to grids 25 and 31 assumes a proper phase relation with respect to the anode voltage.

The output voltage of the bridge is impressed across a center-tapped resistor 70. The slider 40 is connected by a conductor 71 to the upper terminal of resistor 70 and the contact arm 16 is connected by a conductor 72 to the lower end of resistor 70. The upper end of resistor 70 is in turn connected by conductors 73 and 74 to grid 25 and the lower end of resistor 70 is connected by conductors 75 and 76 to grid 31.

Condensers 78 and 79 are connected between the grids and cathodes of the two tubes 21 and 22. The condenser 78 is connected between grid 25 and cathode 23 by conductors 74, 80, condenser 78, and conductors 81, 82, 83 and 84. The condenser 79 is connected between grid 31 and cathode 29 by conductors 76, 86, 87, 82, 83, and 88. The function of condensers 78 and 79 is to filter out any high frequency voltage impulses. Due to the extreme sensitivity of tubes 21 and 22, a very slight voltage impulse on the grid might serve to cause the tube in question to discharge when such discharge is not desired. By providing condensers 78 and 79 any such voltage impulse, which is usually extremely short in duration, is by-passed through the condenser. The biasing means for the grids 26 and 32 is connected between the center tap 90 and conductor 82 leading to the cathodes 23 and 29. This biasing means will be described presently.

Power is supplied to the system by a pair of batteries 92 and 93 connected in series. Where the control system of the present invention is employed in connection with an airplane, the batteries 92 and 93 may each be 12 volt batteries.

The battery 92 is employed to energize a motor unit 95 of a voltage converting device which is capable of transforming direct voltage into alternating voltage of a desired frequency. A typical unit of the type which I employ is that known under the trade-name of "Genemotor." Such devices employ a single rotor and a plurality of windings one of which acts as a field winding for the direct current motor and the other of which has induced in it an alternating current of the desired frequency. For convenience of illustration, the motor and generator units are shown as though they were a separate motor and generator and have been designated by reference numerals 95 and 96. The battery 92 is connected to the generator unit 95 by conductors 97 and 98.

The motor and generator units of the voltage converter are secured to a shaft 99. This shaft is in turn connected to the high speed end of a gear train 100. The lower speed end of this gear train is connected to a shaft 101 to which is secured a rotary contactor disk 102. This disk comprises two concentric circular tracks. The inner track 103 is conductive and has a brush 104 in continual engagement therewith. The outer track consists of insulating material 105 except for a short arcuate portion 106 of conductive material, this arcuate strip of conductive material being connected by a conductor 107 to the conductive strip 103. Cooperating with the outer track are brushes 108, 109 and 110. These brushes are spaced apart a distance such that the three brushes successively engage the conductive strip 106 for short periods during approximately 180 degrees of the complete 360 degrees of rotation of the disk. During the remaining 180 degrees, the three brushes are all engaging the insulating portion of the disk.

The rotary contactor 102 is employed to control the connections of brush 104 to points at various potentials with respect to the potential of the cathodes. A pair of potentiometers 112 and 113 are connected across battery 92. Potentiometer 112 comprises a resistance 114 and a sliding contact 115. The potentiometer 113 comprises a resistance 117 and a sliding contact 118. The upper ends of the resistances 114 and 117 are connected to the positive end of battery 92 by conductors 120, 121, 122 and 123. The lower ends of resistors 114 and 117 are connected to the negative end of battery 92 by conductors 125, 126, 127, 128, 129, 130 and 131. It can be readily seen that the upper ends of resistances 114 and 117 of potentiometers 112 and 113 are connected to the positive terminal of battery 92 and the lower ends to the negative terminal.

A condenser 135 is connected to slidable contact 115 and through conductor 125 to the lower terminal of potentiometer 114 so as to be in parallel with the lower portion of resistance 114. A similar condenser 136 is connected between tap 118 and the lower terminal of resistor 117.

A plurality of choke coils 140, 141 and 142 are connected in series with brushes 108, 109 and 110 as will be presently explained. Connected in series with choke coils 140, 141 and 142 are condensers 143, 144 and 145. Shunting the condensers 143, 144 and 145 are resistors 147, 148 and 149. The resistors 147, 148 and 149 serve to bleed off any charge on condensers 143, 144 and 145 as soon as they are disconnected from a source of power. They have relatively high resistance values in order not to shunt the condensers appreciably.

Connected in series with brush 104 is a rheostat 150. This rheostat comprises a resistor 151 and a slidable contact 152.

A resistor 154 and a resistor 155 of a rheostat 156 are connected in series with battery 93. The rheostat 156 comprises, in addition to the resistor 155, a slidable contact 157. The resistors 154 and 155 are connected in series with battery 93 by conductors 159 and 131.

*Operation*

The various elements are shown in the position that they assume when the control system is balanced. Under these conditions, the motor 10 is energized by the following circuit: from the positive terminal of battery 92 through conductors 123, 160 and 161, motor 10, and conductors 162, 163, 129, 130 and 131 to the other terminal of battery 92. A circuit is also established to the filament heaters 24 and 30 as follows: from the positive end of battery 92 through conductors 123, 160, and 168, filament heater 24, conductor 169, filament heater 30, and conductors 170, 82, 167, 163, 129, 130 and 131 back to the negative terminal of battery 92. In spite of the fact that the motor 10 is running and tubes 21 and 22 are ready for operation, however, no movement of the shaft 14 takes place due to the fact that both windings 12 and 13 are deenergized. This is due to the fact that since the resistance bridge comprising potentiometers 17 and 38 is balanced no voltage is impressed across resistor 70. The grids 25 and 31 are both biased negatively by the potential existing across the right-hand end of resistor 155 which is introduced between the grids and cathodes by the following circuits. Considering first the grid 25, this grid is connected to cathode 23 by the following circuit: from grid 25 through conductors 74 and 73, the upper end of resistor 70, tap 90, conductor 165, contact 157, the right-hand portion of resistor 155, conductors 130, 163, 167, 82, 83, and 84 to cathode 23. Grid 31 is connected to cathode 29 by the following circuit: from grid 31 through conductors 76 and 75, the lower portion of resistor 70, tap 90, conductor 165, slidable contact 157, the right-hand end of resistor 155 and conductors 130, 163, 167, 82, 83 and 88. It will be noted that, as previously indicated, the right-hand portion of resistor 155 is connected in series between the grid and cathode of each tube, the right-hand end of the resistor being connected to the cathodes and the left-hand end to the grids. Inasmuch as the right-hand end of resistor 155 is connected to the positive end of battery 93 and the left-hand end through resistor 154 to the negative end of battery 93, the connection of the right-hand portion of resistor 155 between the grids and cathodes serves to bias the grids negatively by a voltage equivalent to that existing across the right-hand portion of the resistor 155. The magnitude of this voltage can be initially adjusted by adjusting the position of slidable contact 157.

As far as the connections of resistors 154 and 155 across battery 93 are concerned, the left-hand end of resistor 155 will assume a potential intermediate the potentials existing at the positive and negative terminals of the battery 93, the value of this potential depending upon the relative values of resistors 154 and 155. Due to the rotary contactor 102 and the various connections described, however, the potential of the left-hand end of resistor 155 is periodically changed for short periods of time. As long as the brushes 108, 109 and 110 are engaging the insulated portion of the outer track 105, the rotary contactor 102 does not affect the potential of the left-hand end of resistor 155. This condition will exist during half of each revolution of contactor 102. The gear train 100 is so selected that there is one revolution of contactor 102 during each six cycles of the alternating voltage generated by generator 96. Thus, the brushes 108, 109 and 110 are in engagement with the insulated portion of the outer track 105 during three of each six cycles of the alternating voltage applied to the output circuits of tubes 21 and 22 and to the impedance bridge which supplies the controlling grid voltage. Thus, during three of the six cycles the biasing voltage is unaffected by the contactor 102. When, however, the rotating contactor has moved to a portion such that the brush 110 engages the conductive arcuate portion 106, a circuit is established between the positive terminal of battery 92 and the left hand end of resistance 155 as follows: from the positive terminal of battery 92 through conductors 123, 122 and 179, condenser 145, inductance 142, conductor 180, brush 110, conductive strip 106, conductor 107, conductive strip 103, brush 104, conductor 172, contact 152 to the right-hand portion of resistor 151, and conductor 174 to the left-hand end of resistor 155. The establishment of this connection tends to connect the left-hand end of resistor 155 to the positive terminal of battery 92. Since the cathodes 23 and 29 are connected to the negative end of battery 92, it will be obvious that any such tendency tends to raise the potential of the grid with respect to the cathode by an amount dependent upon the setting of rheostat 150.

This raise in potential will take place very abruptly since when the connection is initially established, the condenser 145 is discharged and offers substantially no impedance to the flow of current. The result is that the voltage applied to the grid rises very quickly. Almost immediately, the voltage starts to drop again because of the impedance offered to the flow of current through the circuit just traced by the condenser 145 as it becomes charged. The result is that there is a quick rise in grid voltage and a relatively quick drop creating a peak in the biasing voltage. The tendency is for this peak in the grid voltage to be extremely sharp. While it is desirable to have a voltage peak of relatively short duration, it is undesirable for this voltage change to occur too rapidly. If the voltage change is too rapid there is a danger that transient voltages may be introduced in the system. Such transient voltages, due to the extreme sensitivity of the gas filled tubes, may lead to one or both of the tubes becoming conductive at times when they should not be conductive.

The inductance 142 acts to prevent a too rapid change in the grid voltage and hence to prevent such transient voltages being introduced into the system. The effect of the inductance 142 is to round the tops of the voltage peaks.

After a very brief interval, the conductive strip 106 will move from engagement with brush 110. The length of conductive strip 106 is sufficient for the voltage peak to be substantially terminated before brush 110 and conductive 106 are separated. After a period of time corresponding to the length of one complete cycle of the grid voltage, the conductive strip 108 will engage the brush 109. When this happens, a connection will be established between tap 118 and the left-hand end of resistor 155 as follows: from tap 118 through conductor 176, condenser 144, inductance 141, conductor 177, brush 109, conductive strip 106, conductor 107, conductive strip 103, brush 104, conductor 172, contact 152, resistor 151, and conductor 174 to the left-hand end of resistor 155. It will be noted that the slidable contact 118 is at a potential intermediate in value between the positions at the positive and negative terminals of battery 92. As a result, there is a tendency for the grid voltage again to be raised abruptly. This increase in the grid voltage will, however, be less than in the case previously described when conductive strip 106 was engaging brush 110. Again, there will be a voltage peak, the duration of which is determined by the charge of condenser 144. As in the preceding case, the inductance 141 serves to prevent this voltage from changing too abruptly.

At the end of a period of time equal in length to a cycle of the grid voltage, the conductive strip 106 will move into engagement with brush 108. When this happens a circuit will be established between contact 115 and the left-hand end of resistor 155 as follows: from slider 115 through conductor 170, condenser 143, inductance 140, conductor 171, brush 108, conductive strip 106, conductor 107, conductive strip 103, brush 108, conductor 172, contact 152, resistor 151 and conductor 174 to the left hand end of resistor 155. While the potential of tap 115 is considerably lower with respect to the positive terminal of battery 192 than slider 118, it is still at a higher potential than the positive terminal of battery 93 and at a very much higher potential than the negative terminal of battery 93 to which the left-hand terminal of resistor 155 is normally connected. Thus, the establishment of this connection tends to raise the potential of the left-hand terminal of resistor 155 and hence to raise the potential of the grid voltage. The condenser 143 serves to limit the duration of the voltage peak and the inductance 140 to limit a sharpness of the voltage peak.

During the next three cycles of grid voltage, the brushes 108, 109 and 110 will be in engagement only with the insulating portion of the outer track so that the grid voltage will be constant.

It will be seen from the foregoing description that during three cycles of the grid voltage, voltage peaks are superimposed upon the grid voltage, these peaks being of relatively short duration and decreasing in magnitude in succeeding cycles. During the next three cycles, the grid voltage is constant. The various values of the voltage peaks are so selected that in the absence of an unbalanced potential at the resistance bridge, neither of the grids 26 and 32 is raised above the cut-off potential. In other words, as long as the bridge is perfectly balanced it is not desirable for either tube 21 or 22 to discharge. The operation of the resistance bridge will now be considered. As previously indicated, the transformer 57 is employed to supply power to this bridge. The primary 58 of the transformer is connected to the output terminals of the alternating current generator 96 as follows: from the generator 96 through conductors 182 and 184, primary winding 58, and conductors 185 and 186 to the other terminal of the generator 96. This connection serves to impress across the primary winding an alternating voltage. As a result, the secondary 59 is energized to impress an alternating voltage on the bridge.

As long as contact members 40 and 16 occupy corresponding positions with respect to their associated resistors 39 and 18, no voltage exists across the output terminals of the bridge. This is on the assumption that rheostats 44 and 48 are set in the same positions. Let it be assumed that the condition to which controller 41 is responsive now changes in such a manner as to cause slider 40 to move to the right with respect to slider 16. Under these conditions, an unbalance voltage exists across the bridge, which voltage will be impressed across resistor 70. Furthermore, this voltage is such that during the half cycle in which anodes 27 and 33 are positive, the potential of the upper end of the resistor 70 is higher than the potential at the lower end. The result of this is that the potential of grid 25 tends to be raised with respect to cathode 23 and the potential of grid 31 tends to be lowered with respect to cathode 29.

If this unbalance in the bridge is very slight, as may well be the case, the slight amount of voltage change may not be sufficient to overcome the biasing effect introduced by the potential existing across the right-hand end of resistor 155 when the left-hand end is at its normal potential. As previously explained, however, the grid potential is periodically increased momentarily. This is graphically shown in Figure 2 in which the numeral 190 is employed to indicate the potential existing between the anode and cathode during the conductive half cycle and in which the reference numeral 191 indicates the grid voltage. For clarity of illustration, the amplitude of the grid voltage has been somewhat distorted and it is assumed that the cut-off potential is cathode potential rather than a value somewhat below cathode potential as would normally be the case. The peaks superimposed on the grid voltage by operation of the contactor 102 are designated by the reference characters 192, 193 and 194. It will be noted that during the first six cycles of plate voltage in the diagram, the normal grid voltage, due to the combined effects of the normal biasing potential and the unbalanced voltage of the bridge and disregarding the voltage peaks 192, 193 and 194 is not sufficient to cause the grid potential to rise above the cut-off value. During these six cycles, however, the unbalance of the bridge is sufficient so that when the peak 192 is superimposed on the grid voltage the grid voltage is raised above the cut-off value so as to render the tube in question conductive. With a gas filled tube such as employed in the present system, the tube remains conductive after it has once become so, as long as the voltage is applied to the anode circuit. Consequently, the tube will discharge during the entire cycle. During the next cycle, in which the peak 193 is superimposed on the grid voltage the total grid voltage is at no time above the cut-off point so that the tube remains non-conductive. Since the voltage peak 194 is even less in magnitude, the tube will also be non-conductive during the next cycle. Since no voltage peaks are applied during the next three cycles the tube will continue to be non-conductive during the next three cycles.

Figure 2:
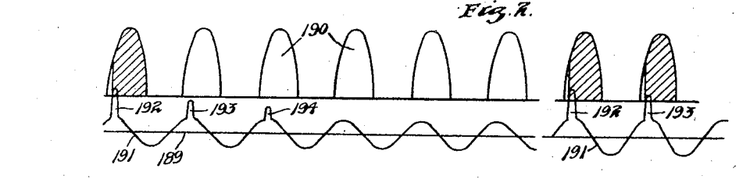
Figure 2 is a diagrammatic view indicating the relationship between the grid and plate voltages of the system shown in Figure 1.

The first two cycles of a second series of six cycles are shown in Figure 2. It is assumed in connection with the second series that the unbalance of the bridge is slightly greater. Under these conditions, the amplitude of the grid voltage 191 is greater so that the grid potential is above the cut-off value during both of the first of the two cycles. Under these conditions, the third cycle would still be non-conductive and, of course, during the succeeding three cycles, the tube would be non-conductive. If the unbalance were slightly greater, it will be obvious that the tube would be conductive during the first three cycles and non-conductive during the last. If the unbalance were still greater so that the amplitude of the grid voltage disregarding the peaks 192, 193 and 194 was sufficient to bring the grid potential always above the cut-off value, the tube would be conductive during every cycle of the anode voltage.

It will be noted that the phase relationship between the grid and plate voltages is such that the maximum value of the grid voltage occurs in an early portion of the cycle of anode voltage. The advantage of this is that during those cycles in which the tube is conductive, it is conductive over the greater portion of the cycle. This desirable phase relationship is obtained by means of condenser 64 and resistor 67, which are suitably proportioned to give the desired phase shifting effect.

Referring back to Figure 2, it will be noted that in the first cycle of plate voltage, the grid voltage is of sufficient magnitude as to cause the grid potential to exceed momentarily the cut-off value so as to render the tube conductive. The same condition exists during the first two cycles of the second group of cycles of plate voltage. In the case which has been considered, the upper end of resistor 70 is positive with respect to the lower end as a result of the unbalance of the bridge. Consequently, the potential of the voltage applied to grid 25 is in phase with the plate current so that tube 21 is the one which will be rendered conductive during the first cycle of the first six cycles of plate voltage considered. When this occurs, current will flow through tube 21 and winding 13 as follows: from the upper terminal of generator 96 through conductors 182 and 195, winding 13, conductor 196, anode 27, cathode 23, and conductors 84, 83, 82, 167, 163, 130, 131, 97, 198, and 186 to the other terminal of generator 96. The establishment of this circuit causes winding 13 to be energized with the result that one of the two clutches of mechanism 11 is engaged. The engagement of this clutch will cause shaft 14 to rotate in such a direction as to move the control device 15 in a predetermined direction and to move the contact arm 16 in a clockwise direction. The movement of contact arm 16 in a clockwise direction will cause the bridge to be rebalanced with the result that the magnitude of the A. C. unbalanced voltage gradually decreases. When the bridge is completely balanced, the voltage applied to grid 26 will be merely the total biasing voltage consisting of the normal biasing voltage as represented by the line 189 and the peak voltages 192, 193 and 194. This biasing voltage never assumes a value sufficiently high to cause the tubes to discharge. Thus, the tube 21 will again become non-conductive so that winding 13 is deenergized and further movement of controlled device 15 and contact arm 16 is terminated. By proper adjustment of the system, the amount of movement of the control device will correspond in any desired manner to the amount of movement of the controller.

By varying the position of the rheostat 52, the effect of a given movement of contact arm 16 can be varied so as to require a greater or a lesser movement of the control device before the system is rebalanced. Because of the fact that rheostat 52 is in parallel with potentiometer 72, the rebalancing effect of potentiometer 17 depends upon the setting of rheostat 52. Obviously, the lower the total impedance of rheostat 52, the greater will be the current flow through the lower portion of the bridge. This will increase the voltage drop across the resistors of rheostats 44 and 48 and decrease the voltage drop across resistor 18. The lower the voltage drop is across resistor 18 as compared with that across resistor 39, the greater will be the necessary movement of contact arm 16 in order for the system to be rebalanced. Conversely as the resistance value of impedance 52 is increased, the effect of potentiometer 17 is correspondingly increased so that a smaller adjustment of arm 16 is necessary.

The two impedances 44 and 48 are provided for adjusting the position of the control device with respect to the controller. If the sliders of both impedances are moved towards the left, the bridge will be balanced when contact arm 16 assumes a position electrically to the left of slider 40. When the sliders of both rheostats 44 and 48 are moved to the left, the bridge will be rebalanced when contact arm 16 assumes a position electrically to the right of slider 40. Thus by adjusting rheostats 44 and 48, the control device may be caused to assume any position for any given value of the controlling condition.

Let it be assumed now that instead of the condition changing in such a manner as to cause contact 40 to be moved to the right, it changes in such a manner as to cause it to be moved to the left. Under these conditions, it will be obvious that the unbalance voltage is disposed 180 degrees in phase from that previously considered. In other words, during the half cycle in which anodes 27 and 33 are positive, the lower end of resistor 70 will be at a potential positive with respect to the upper end. Under these conditions, the potential of grid 31 is raised with respect to cathode 29 and the potential of grid 25 is lowered with respect to cathode 23. When this happens, the voltage curve represented by line 191 of Figure 2 portrays the voltage applied to grid 32 of tube 22. Thus, assuming that the unbalance is exactly the same as shown in connection with the first six cycles, the tube 22 will become conductive during the first one of each six cycles. When it is so conductive, current will flow through the following circuit to electromagnetic winding 12: from the upper terminal of alternating current generator 96 through conductors 182 and 195, field winding 12, conductor 201, anode 33, cathode 29, and conductors 88, 83, 82, 167, 163, 130, 131, 97, 198, and 186. The result of the establishment of this circuit is that the electromagnetic winding 12 is energized so that the other clutch is now engaged. As a result, the motor 10 rotates the shaft 14 in the opposite direction so as to move control device 15 in the opposite direction and to rotate contact arm 16 in the counterclockwise direction. Such counter-clockwise rotation of contact arm 16 will tend to rebalance the bridge in the manner previously considered. Thus, when contact arm 16 assumes a position corresponding to the position of contact 40, the bridge will be rebalanced so that both tubes 21 and 22 will again become non-conductive.

In the case of the unbalance of the bridge in either direction, it is obvious that the magnitude of the alternating component of the grid voltage 191 will depend upon the magnitude of unbalance. Thus, if the bridge is unbalanced to a greater degree than that just considered, the axis of the alternating current voltage will be exactly the same but the maximum peak value will be considerably higher. Such a condition is illustrated in connection with the last two cycles of Figure 2 in which the unbalance is sufficiently great that both of the first two cycles are conductive ones. As previously explained, the unbalance voltage is still sufficiently small that the third cycle will not be a conductive one so that the tube in question will be conductive only two out of every six cycles. If this unbalance voltage is increased sufficiently as to cause the grid voltage to exceed the cut-off voltage at the beginning of the third voltage cycle, it will be obvious that the tube in question will be conductive during the first three out of each six cycles. Under extreme conditions, the unbalance of the bridge will rise to a value in which the grid voltage will always exceed the cut-off potential. Under these conditions, the tube will be conductive during the entire time. As the bridge balance is restored, however, the tube will be conductive during smaller and smaller portions of the total number of cycles with the result that the speed of shaft 14 will be correspondingly reduced. Thus, provision is made for operating the controller at a relatively rapid speed when the unbalance is great and for operating it at a slow speed as balance is approached. With the arrangement described, it is possible to have an extremely sensitive system wherein the motor adjusts the position of the control device upon very slight changes in the value of the controlling condition.

Figure 3:
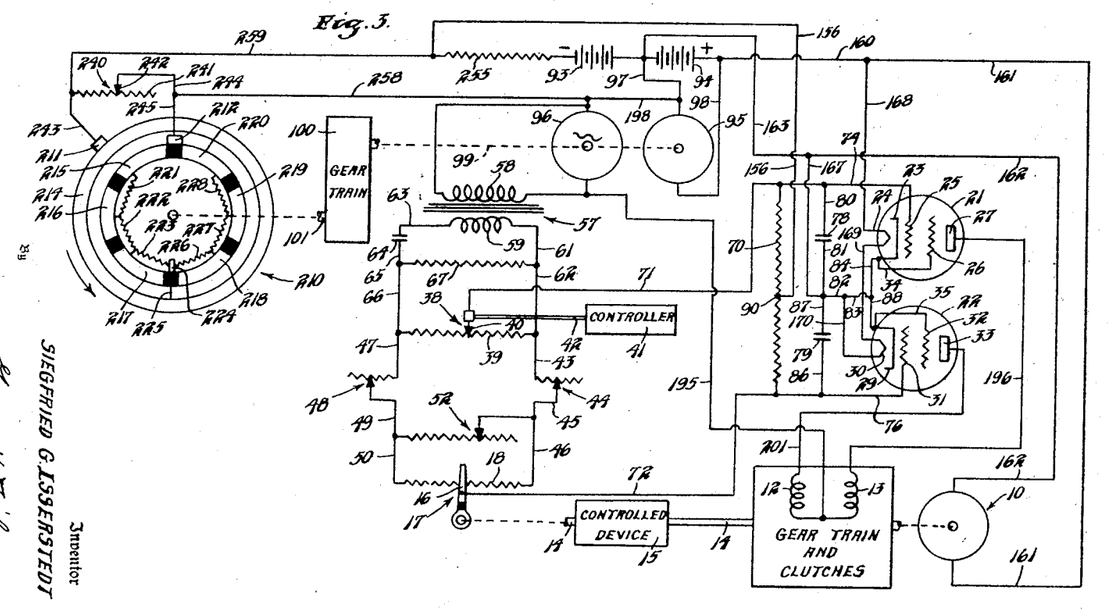
Figure 3 is a schematic view of a modified form of my motor control system.

Species of Figure 3

The species of Figure 3 is substantially similar to that of Figure 1 with the exception that the change in biasing voltage exists for an entire cycle of the grid voltage rather than being changed for very brief intervals as in Figure 1. Furthermore, provision is made for increasing the grid voltage gradually through a maximum value and then gradualy decreasing it. In view of the fact that much of the apparatus of Figure 3 is identical to that of Figure 1, it is believed unnecessary to describe this apparatus again. The same numerals have been applied to Figure 3 to elements identical in function to those of Figure 1, and it is believed that by a comparison of Figures 1 and 3, these portions of Figure 3 will be obvious without further description.

A rotary contactor 210 is secured to a shaft 101 leading from the reduction gear train 100. This rotary contactor 210 comprises an outer and an inner track with which cooperate brushes 211 and 212. The outer conductive track consists of a continuous metal strip 214. The inner conductive track consists of a plurality of segments 215, 216, 217, 218, 219, and 220, each of these segments being separated from each other by insulating material. A resistance element 221 extends between conductive segments 215 and 216 and is connected thereto. A second resistance element 222 is connected between segments 216 and 217. A third resistance element 223 is connected between segment 217 and a conductive terminal 224 which extends through the insulating segment adjacent to it and is connected by a conductor 225 to the outer conductive member 214. A resistor member 226 corresponding to resistor member 223 is connected between the terminal 224 and segment 218. Likewise, a resistor member 227 is connected between segments 218 and 219. A sixth resistor member 228 is connected between segments 219 and 220. As the contactor 210 is rotated in a counter-clockwise direction, the brush 212 will successively engage contact segments 220, 219, and 218. When the brush 212 is in engagement with segment 220, the brush 212 is connected to brush 211 by contact segment 220, resistors 228, 227, and 226, terminal 224, conductor 225, conductive strip 214 and brush 211. In other words, the three resistors 228, 227 and 226 are connected in series between brushes 212 and 211. When the disk has moved to a point where brush 212 engages segment 219, the circuit between brushes 212 and 211 will include only resistors 227 and 226. When the brush 212 engages segment 218, only resistor 222 will be included. Upon further rotation of the contactor 210 in a clockwise direction, the brush 212 successively engages segments 217, 216, and 215. Upon engagement of segment 217, the resistor remains the same because of resistor 223 being connected in series between segment 217 and brush 211. Upon brush 212 engaging segment 216, resistors 222 and 223 are connected in series between brushes 211 and 212. When the contactor has rotated still further until brush 212 is in engagement with segment 215, resistors 221, 222 and 223 will all be connected between brushes 211 and 212. It is believed that it will be obvious from the preceding paragraphs that upon continuous rotation of contactor 210, the amount of resistance between brushes 212 and 211 is decreased in three steps and is then increased in three steps, this cycle being repeated for each revolution of the contactor.

A rheostat is indicated by the reference numeral 240. This rheostat comprises a resistor 241 and slidable contact 242. The rheostat is connected between brushes 211 and 212 by conductors 243, 244 and 245. The left-hand portion of resistor 241 will thus be connected in parallel with the resistance units 221 to 223 and 226 to 228, previously considered.

A resistor 255 is connected directly to the negative terminal of battery 93. The resistor 255 and battery 93 are connected between the center tap 90 of the resistor 70 and conductor 82 by the following circuit: from tap 90 through conductor 156, resistor 255, battery 93, and conductors 163 and 167 to conductor 82. It will be recalled that conductor 82 is connected to the two cathodes and that center tap 90 is conductively connected to the two grids. Hence, the biasing voltage will be determined by the voltage introduced by the circuit just traced. This circuit includes the voltage of battery 93 which is fixed minus the potential drop across resistor 255. The amount of this potental drop depends upon the current flow through resistor 255. The rheostat 240 and the various resistors introduced by contactor 210 are connected in series with battery 93 and resistor 255. Thus, considering the rheostat 240, a circuit may be traced through resistor 241 of rheostat 240 as follows: from the positive terminal of battery 93 through conductors 97, 198, 258, and 244, the left-hand portion of resistor 241, conductor 259 and resistor 255 to the left-hand terminal of the battery 93. As previously indicated, the various portions of resistors 221 to 223 and 226 to 228 are connected in parallel with resistor 241 depending upon the position of the contactor 210. Thus, a variable current will flow through resistor 255 depending upon the position of contactor 210. This variable current flow will produce a variable potential drop across resistor 255 and will hence vary the voltage introduced between tap 90 and conductor 82. As previously indicated, this voltage is the amount of bias which is introduced between the grids and the cathodes.

Operation

From the foregoing description, it will be apparent that as the contactor 210 is rotated, the grid bias is changed in steps. This operation is shown graphically in Figure 4 in which the reference numeral 170 is employed to designate the potential existing between the anode and cathode of the tubes. The reference numeral 171 indicates the potential of the grid of the tube being considered. The numeral 172 indicates that portion of the potential of the grid due to the biasing voltage.

Considering first the condition when brush 212 is in engagement with segment 220, the resistors 228, 227 and 226 will be connected in series between brushes 212 and 211. In other words, the maximum amount of resistance will be in the circuit between brushes 211 and 212 and hence in parallel with the left-hand portion of resistance 241 with rheostat 240. This will reduce the current flow through resistor 255 to a minimum so that the voltage drop across resistor 255 opposing the battery 93 will be at a minimum with the result that the bias on the grids of the tubes will be at a maximum. This condition is indicated in connection with the first cycle of plate voltage.

As soon as the contactor 210 has rotated to a position such that brush 212 is in engagement with segment 219, only the resistors 227 and 226 will be connected between brushes 211 and 212. This will effectively reduce the resistance in parallel with the left-hand portion of resistance 241 and will increase the current flow through resistor 255. This will increase the potential drop across resistor 255 and decrease the amount of the biasing voltage. In other words, the potential of the grid, upon the segment 220 moving out of engagement with and segment 220 moving into engagement with brush 212 will be abruptly raised. This condition is illustrated in Figure 4 in connection with the second cycle of plate voltage. This potential of the grid will be maintained until the brush engages segment 218.

When segment 218 moves into engagement with brush 212, only resistor 226 will be in parallel with the left-hand portion of resistor 241 so that the current flow through resistor 255 will again be abruptly increased. This, in turn, will effect a further decrease in the biasing voltage, or in other words, an increase in the grid potential. The grid will remain at the new value when brush 212 is engaged by segment 217 and until brush 212 has engaged segment 216. This condition of the grid potential is illustrated in Figure 4 in connection with the intermediate two cycles. It will be noted that during these cycles, with the unbalance voltage at the value shown in Figure 4, the tube is conductive during both cycles.

When segment 216 moves into engagement with brush 212, the grid potential will again be decreased due to the fact that resistors 222 and 223 are both connected in parallel with resistor 241. This condition is illustrated in connection with the fifth cycle in Figure 4. When the segment 215 moves into engagement with brush 212, the condition shown in the sixth cycle of Figure 4 will exist. It will be apparent from the above description that the arrangement of Figure 3 functions similarly to that of Figure 2 except that the grid voltage is increased in steps and is relatively constant over any one cycle of grid voltage. It will be obvious that if desired, the number of cycles of plate voltage involved in any one series might be increased. Thus, the grid voltage might be progressively increased over six cycles and decreased over a succeeding six cycles. Furthermore, each value of grid potential might be maintained over several cycles instead of over only one cycle.

In the foregoing description of the operation, no circuits have been traced in connection with the operation when one or the other of the tubes 21 and 22 is rendered conductive. It is believed that this is unnecessary since the circuits are all identical to those considered in connection with Figure 1. It will be obvious that upon either tube being rendered conductive a circuit is established to one of the clutch windings 12 or 13 so as to cause the controlling device 15 to be driven in one direction or the other until the bridge circuit has been rebalanced.

Conclusion

It will be seen that I have provided a motor controlling apparatus making possible a motor control system of extreme sensitivity in which a motor is operated one direction or the other upon extremely slight variations in the controlling voltage.

While I have shown certain specific embodiments of my invention, it is to be understood that this is only for purposes of illustration and that my invention is to be limited solely by the scope of the appended claims.

I claim as my invention:

1. In combination; an electronic amplifier having an input circuit and an output circuit; means for applying a controlling voltage to said input circuit; and means for applying a variable biasing voltage to said input circuit; said last named means comprising a source of power and an impedance connected in said input circuit; resistance means, and switching means operable periodically to connect different portions of said resistance means in parallel with said source of power and said impedance to vary by different amounts the magnitude of said biasing voltage, said biasing voltage being at all times sufficient to prevent said amplifier from being conductive if said controlling voltage is below a predetermined value.

2. In combination; an electronic amplifier having an input circuit and an output circuit; means for applying a controlling voltage to said input circuit; and means for applying a variable biasing voltage to said input circuit; said last named means comprising a unidirectional source of power and an impedance connected in said input circuit, resistance means, and switching means operable first to connect successively decreasing portions of said resistance means in parallel with said source of power and said impedance and then to connect successively increasing portions of said resistance means in parallel with said source of power and said impedance so as to successively decrease and then successively increase the magnitude of said biasing voltage, said biasing voltage being at all times sufficient to prevent said amplifier from being conductive if said controlling voltage is below a predetermined value.

3. In motor controlling apparatus for motor means having a pair of current paths therethrough and operable to rotate in one direction or the other depending upon whether the current flow through one of said paths is greater or less than that through the other, a pair of electronic discharge devices each having a control element for controlling the discharge thereof, each of said devices being adapted to control the current flow through a different one of said two current paths, means for applying a cyclically varying voltage to the output terminals of said devices, means for applying a biasing voltage to the control elements of both discharge devices, impedance means connected to both control elements, and means for applying to said impedance means a cyclically varying voltage in such a manner that said voltage simultaneously opposes the biasing voltage in connection with one control element and aids the biasing voltage in connection with the other depending upon its phase, and means for periodically decreasing the magnitude of said biasing voltage so as to increase the potential of the grid during predetermined positive cycles of said output voltage.

4. In a motor control system, a motor means, an electronic discharge amplifier having an output circuit controlling the operation of said motor means, said amplifier comprising a control element for controlling the discharge thereof, means for applying a cyclically varying voltage to said output circuit, a source of cyclically varying signal voltage having a variable effective value, means for applying to the control element of said discharge amplifier a cyclically varying input voltage including said signal voltage, and timer means for periodically increasing the magnitude of said input voltage during only predetermined cycles of said output voltage by amounts sufficient to render said amplifier conductive in the event of at least a small signal voltage from said source but insufficient to render said amplifier conductive in the absence of such a signal voltage.

5. In a motor control system, a motor means, an electronic discharge amplifier having an output circuit controlling the operation of said motor means, said amplifier comprising a control element for controlling the discharge thereof, means for applying a cyclically varying voltage to said output circuit, a source of cyclically varying signal voltage having a variable effective value, means for applying to the control element of said discharge amplifier a cyclically varying input voltage including said signal voltage, timer means for periodically increasing the magnitude of said input voltage during only predetermined cycles of said output voltage by amounts sufficient to render said amplifier conductive in the event of at least a small signal voltage from said source but insufficient to render said amplifier conductive in the absence of such a signal voltage, and means associated with said timer means for causing a progressive change in the increase in the value of said input voltage during successive cycles of said output voltage.

6. In a motor control system, a motor means, an electronic discharge amplifier having an output circuit controlling the operation of said motor means, said amplifier comprising a control element for controlling the discharge thereof, means for applying a cyclically varying voltage to said output circuit, a source of signal voltage cyclically varying at the same frequency as said output voltage and having a variable effective value, means for applying to the control element of said discharge amplifier a cyclically varying input voltage including said signal voltage, and timer means for periodically increasing the magnitude of said input voltage during only predetermined cycles of said output voltage by amounts sufficient to render said amplifier conductive in the event of at least a small signal voltage from said source but insufficient to render said amplifier conductive in the absence of such a signal voltage.

7. In a motor control system, a motor means, an electronic discharge amplifier having an output circuit controlling the operation of said motor means, said amplifier comprising a control element for controlling the discharge thereof, means for applying a cyclically varying voltage to said output circuit, means including an impedance network for providing a cyclically varying signal voltage varying in phase and magnitude with the relative values of the impedances of said network, a source of biasing voltage, means for applying to the control element of said discharge amplifier a cyclically varying input voltage including said signal voltage and said biasing voltage, and timer means for periodically increasing the magnitude of said input voltage during only predetermined cycles of said output voltage by amounts sufficient to render said amplifier conductive in the event of at least a small signal voltage from said source but insufficient to render said amplifier conductive in the absence of such a signal voltage.

8. In a motor control system, a motor means, an electronic discharge amplifier having an output circuit controlling the operation of said motor means, said amplifier comprising a control element for controlling the discharge thereof, means for applying a cyclically varying voltage to said output circuit, a source of cyclically varying signal voltage having a variable effective value, a source of unidirectional biasing voltage, means for applying to the control element of said discharge amplifier a cyclically varying input voltage including said signal voltage and said biasing voltage, and timer means for periodically decreasing the magnitude of said biasing voltage during only predetermined cycles of said output voltage by progressively changing amounts, the largest decrease of which is sufficient to render said amplifier conductive in the event of at least a small signal voltage from said source but insufficient to render said amplifier conductive in the absence of such a signal voltage.

9. In a motor control system, a motor means, an electronic discharge amplifier having an output circuit controlling the operation of said motor means, said amplifier comprising a control element for controlling the discharge thereof, means for applying a cyclically varying voltage to said output circuit, a source of cyclically varying signal voltage having a variable effective value, a source of unidirectional biasing voltage, means for applying to the control element of said discharge amplifier a cyclically varying input voltage including said signal voltage and said biasing voltage, and timer means for periodically decreasing the magnitude of said biasing voltage during only predetermined cycles of said output voltage by progressively increasing and then decreasing amounts, the largest decrease of which is sufficient to render said amplifier conductive in the event of at least a small signal voltage from said source but insufficient to render said amplifier conductive in the absence of such a signal voltage.

10. In a motor control system, a motor means, an electronic discharge amplifier having an output circuit controlling the operation of said motor means, said amplifier comprising a control element for controlling the discharge thereof, means for applying a cyclically varying voltage to said output circuit, a source of cyclically varying signal voltage having a variable effective value, means for applying to the control element of said discharge amplifier a cyclically varying input voltage including said signal voltage, and means for increasing the magnitude of said input voltage during a portion of the cycles of said output voltage by progressively changing amounts, the greatest of which is sufficient to render said amplifier conductive in the event of at least a small signal voltage from said source but insufficient to render said amplifier conductive in the absence of such a signal voltage, said last-named means comprising circuit connections associated with said control element, a plurality of resistors, and contactor means for selectively connecting different of said resistors in said circuit connections during different cycles of said output voltage.

11. In combination, a gaseous electronic discharge amplifier having an output circuit and a control element for controlling the discharge through said amplifier and hence the flow of current in said output circuit, means for applying a cyclically varying voltage to said output circuit, means for applying to the control element of said discharge amplifier a cyclically varying input voltage including a cyclically varying signal voltage having a variable effective value, and timer means for periodically increasing the magnitude of said input voltage during only predetermined cycles of said output voltage by amounts sufficient to render said amplifier conductive in the event of at least a small signal voltage but insufficient to render said amplifier conductive in the absence of such a signal voltage.

SIEGFRIED G. ISSERSTEDT.

REFERENCES CITED

The following references are of record in the file of this patent:

UNITED STATES PATENTS

| Number    | Name           | Date          |
|-----------|----------------|---------------|
| 2,164,728 | Wey            | July 4, 1939  |
| 2,080,250 | Bedford        | May 11, 1937  |
| 2,272,714 | Lamb           | Feb. 10, 1942 |
| 2,169,294 | Scull          | Aug. 15, 1939 |
| 2,047,984 | Riggs          | July 21, 1936 |
| 1,960,350 | Shackleton et al. | May 29, 1934 |
| 1,977,256 | Swart          | Oct. 16, 1934 |
| 1,867,398 | Cockerell      | July 12, 1932 |